April 25, 1967 R. A. DUFF 3,315,969
CRANKSHAFT OIL SEAL WITH TAPERED INSTALLATION LEADER
Filed March 29, 1965

Richard A. Duff
INVENTOR.

United States Patent Office 3,315,969
Patented Apr. 25, 1967

3,315,969
CRANKSHAFT OIL SEAL WITH TAPERED INSTALLATION LEADER
Richard A. Duff, 903 S. Mill St.,
Decorah, Iowa 52101
Filed Mar. 29, 1965, Ser. No. 443,373
6 Claims. (Cl. 277—11)

The present invention relates to a crankshaft main bearing oil seal, and more particularly to a crankshaft main bearing oil seal member which is elongated and constructed so as to be easily inserted in the upper main crankshaft bearing halves of an engine and which may be installed without the use of conventional oil seal pullers presently used.

The primary object of this invention is to provide an elongated crankshaft main bearing seal member tapered at one end and including a wire-like leader which projects outwardly of and is woven into the tapered end of the seal member, which leader is used to install the oil seal member about the upper portion of the crankshaft of a motor vehicle.

A still further object of the present invention is to provide a braided crankshaft oil seal member having a flexible leader element or member tortuously embedded therein, and with one end portion of the flexible leader member extending outwardly from one end of the seal member, whereby the oil seal member may readily be installed about a crankshaft without the use of special seal member pullers.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
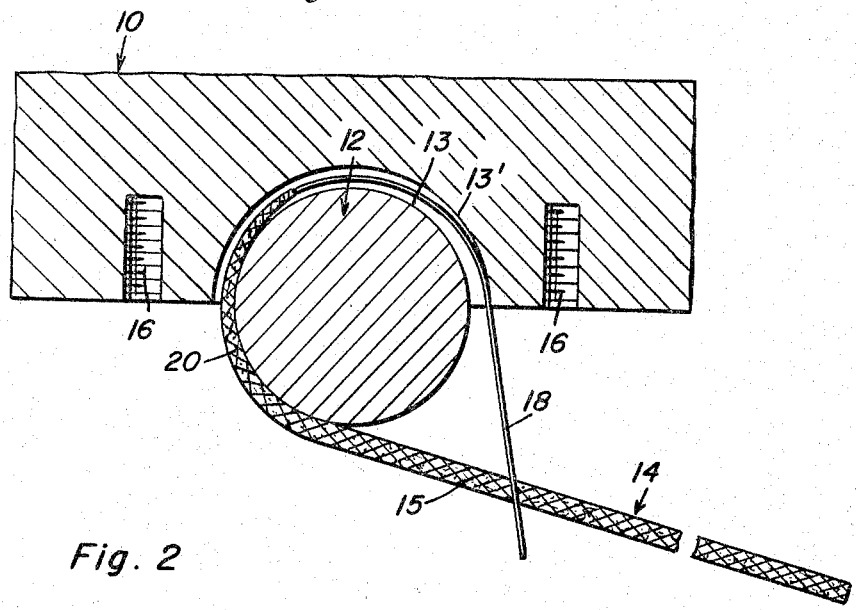
FIGURE 1 is a fragmentary vertical sectional view taken substantially upon a plane passing transversely through a portion of an engine block and illustrating the manner in which the oil seal member of the present invention may be installed in an upper main bearing half of the engine.
Figure 2:
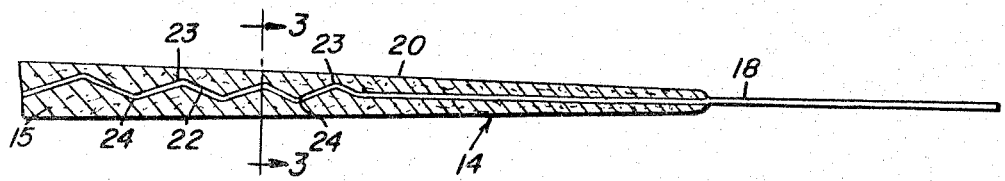
FIGURE 2 is a fragmentary longitudinal vertical sectional view of the first inserted end of the oil seal member comprising the present invention, showing the flexible wire leader member tortuously embedded therein.
Figure 3:
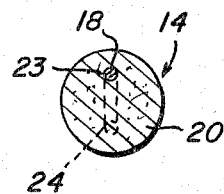
FIGURE 3 is an enlarged vertical cross-sectional view of the oil seal member taken substantially upon the plane designated by the section line 3—3 of FIGURE 2.

Referring now more particularly to the drawings the numeral 10 generally designates the block of an internal combustion engine in which a crankshaft 12 is journaled by a plurality of semi-cylindrical seats or upper bearing halves formed in the block 10, one of which seats being illustrated at 13. The seat 13 includes an oil seal member groove 13' and the invention contemplates provision of an oil seal member 14 which may be readily installed while the crankshaft 12 is in its illustrated position. Threaded bores 16 are provided in the block 10 for receiving cap screws (not shown) to retain a lower main bearing cap (not shown) in position over the lower half of the crankshaft 12.

The oil seal member 14 is somewhat conventional in construction in that it is constructed of woven seal material 15. However, the seal member includes a flexible but stiff wire member 18 which is woven into the seal material 15. The seal member 14 is tapered at one end as at 20 and the flexible wire member 18 is embedded in the tapered end 20 with the embedded end thereof extending throughout the length of at least a substantial portion of the tapered end 20. Further, the embedded end of the wire member 18 includes a terminal end portion 22 spaced from the terminal end of the tapered end 20 and which includes a series of alternate reverse curves 23 and 24 whereby the wire member 18 follows a zigzag path. Further, the distance between adjacent curves 23 and 24 gradually increases toward the non-tapered end of the seal member 14. This construction will, of course, strongly resist the wire member from being pulled out of the seal material 15.

In operation, the wire member 18 is first bent as illustrated in FIGURE 1 and then inserted through the groove 13'. Thereafter, the free end of the wire member 18 is pulled through the groove 13' until the non-tapered end of the seal member 14 is flush with the end of the groove 13' in which the wire member 18 was first inserted. Then, the seal member 14 is cut flush with the remote end of the groove 13' to complete the installation of the seal member 14. Thereafter, the remaining portion of the seal member 14 may be used in subsequent installations.

When using the oil seal of the present invention no special tools or adapters are necessary. The tapered end portion 20 is of a length to extend completely through the groove 13' and the seal member 14 may be made in any desired size. In the event of badly worn crankshafts an oversize seal member may be used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:
1. In combination with an elongated conventional crankshaft main bearing oil seal member of the type constructed of flexible material, the improvement comprising a tapered and flexible end portion formed integrally on one end of said seal member of a length adapted to extend at least halfway around an associated crankshaft, said tapered end portion having an elongated, longitudinally extending and flexible pull member embedded therein, one end of said pull member projecting outwardly of the terminal end of said tapered end portion and the other end of said pull member embedded in said tapered end portion including a series of longitudinally spaced and alternately reversing curves formed therein so as to define a zigzag path through said tapered end portion.

2. The combination of claim 1 wherein said curves are spaced longitudinally of said tapered end portion from the free terminal end thereof.

3. The combination of claim 1 wherein the spacing between said curves gradually increases toward the major diameter end portion of said tapered end portion.

4. In combination with an elongated conventional crankshaft main bearing oil seal member of the type constructed of flexible material, the improvement comprising a tapered and flexible end portion formed integrally on one end of said seal member of a length adapted to extend at least halfway around an associated crankshaft, said tapered end portion having an elongated, longitudinally extending and flexible pull member embedded therein, one end of said pull member projecting outwardly of the terminal end of said tapered end portion and the other end of said pull member embedded in said tapered end portion including a plurality of curved portions defining a tortuous path extending generally longitudinally of said tapered end portion.

5. The combination of claim 4 wherein said curved portions are spaced longitudinally of said tapered end portion from the free terminal end thereof.

6. The combination of claim 4 wherein said tortuous path gradually increases in transverse dimension toward the major diameter end of said tapered end portion.

References Cited by the Examiner

UNITED STATES PATENTS

| | | | |
|---|---|---|---|
| 2,621,398 | 10/1952 | Simmons | 277—1 X |
| 3,084,423 | 4/1963 | Fullerton. | |
| 3,112,112 | 11/1963 | Wright | 277—11 |
| 3,171,193 | 3/1965 | Bowden. | |

SAMUEL ROTHBERG, *Primary Examiner.*